United States Patent
Ohkoshi et al.

(10) Patent No.: US 10,807,880 B2
(45) Date of Patent: Oct. 20, 2020

(54) EPSILON IRON OXIDE AND METHOD FOR PRODUCING THE SAME, MAGNETIC COATING MATERIAL AND MAGNETIC RECORDING MEDIUM

(71) Applicants: THE UNIVERSITY OF TOKYO, Tokyo (JP); DOWA ELECTRONICS MATERIALS CO., LTD., Tokyo (JP)

(72) Inventors: Shin-ichi Ohkoshi, Tokyo (JP); Syunsuke Oka, Tokyo (JP); Asuka Namai, Tokyo (JP); Kenji Masada, Tokyo (JP)

(73) Assignees: THE UNIVERSITY OF TOKYO, Tokyo (JP); DOWA ELECTRONICS MATERIALS CO., LTD., Tokyo (JP)

( * ) Notice: Subject to any disclaimer, the term of this patent is extended or adjusted under 35 U.S.C. 154(b) by 378 days.

(21) Appl. No.: 15/735,410

(22) PCT Filed: Jun. 13, 2016

(86) PCT No.: PCT/JP2016/067554
§ 371 (c)(1),
(2) Date: Dec. 11, 2017

(87) PCT Pub. No.: WO2016/199937
PCT Pub. Date: Dec. 15, 2016

(65) Prior Publication Data
US 2018/0170767 A1    Jun. 21, 2018

(30) Foreign Application Priority Data

Jun. 12, 2015    (JP) .................................. 2015-119680
Jun. 13, 2016    (JP) .................................. 2016-116784

(51) Int. Cl.
$C01G\ 49/02$    (2006.01)
$C09C\ 1/22$    (2006.01)
(Continued)

(52) U.S. Cl.
CPC ............. $C01G\ 49/02$ (2013.01); $C01G\ 49/06$ (2013.01); $C09C\ 1/22$ (2013.01); $C09C\ 1/24$ (2013.01);
(Continued)

(58) Field of Classification Search
CPC .......... C01G 49/02; C01G 49/06; C09C 1/24; H01F 1/11
See application file for complete search history.

(56) References Cited

U.S. PATENT DOCUMENTS 5,047,161 A    9/1991    Steck et al.
10,504,548 B2 *  12/2019    Sakane .................. C01G 51/40
(Continued)

FOREIGN PATENT DOCUMENTS

EP    0200992 A2    11/1986
EP    2165975 A1    3/2010
(Continued)

OTHER PUBLICATIONS

International Search Report from Patent Application No. PCT/JP2016/067554, dated Jul. 12, 2016.
International Preliminary Report on Patentability from Patent Application No. PCT/JP2016/067554, dated Dec. 12, 2017.
EESR for EP App. No. 16807640.4 dated Jan. 2, 2019.

*Primary Examiner* — C Melissa Koslow
(74) *Attorney, Agent, or Firm* — Greenblum & Bernstein, P.L.C.

(57) ABSTRACT

An epsilon iron oxide has an average particle size of 10 to 18 nm, a part of the iron element being substituted with a substitutional element and has a coercive force of 14 kOe or less, wherein a coefficient of variation of the particle size is 40% or less. A method for producing the same, a magnetic coating material and a magnetic recording medium using the epsilon iron oxide, includes depositing a metal compound of a substitutional element on iron oxide hydroxide to thereby obtain iron oxide hydroxide on which the metal compound
(Continued)

is deposited; coating the iron oxide hydroxide on which the metal compound is deposited, with silicon oxide to thereby obtain iron oxide hydroxide coated with the silicon oxide; and applying heat treatment to the silicon oxide-coated iron oxide hydroxide in an oxidizing atmosphere, wherein a part of an iron element is substituted with the substitutional element.

14 Claims, 3 Drawing Sheets

(51) Int. Cl.
  *C01G 49/06* (2006.01)
  *C09C 1/24* (2006.01)
  *G11B 5/65* (2006.01)
  *H01F 1/11* (2006.01)
(52) U.S. Cl.
  CPC .......... *G11B 5/653* (2013.01); *C01P 2002/52* (2013.01); *C01P 2002/54* (2013.01); *C01P 2004/51* (2013.01); *C01P 2004/64* (2013.01); *C01P 2004/84* (2013.01); *C01P 2006/42* (2013.01); *H01F 1/11* (2013.01)

(56) References Cited

U.S. PATENT DOCUMENTS

| | | |
|---|---|---|
| 2010/0171066 A1 | 7/2010 | Ohkoshi et al. |
| 2014/0314658 A1 | 10/2014 | Hattori |
| 2016/0104560 A1 | 4/2016 | Ohkoshi et al. |

FOREIGN PATENT DOCUMENTS

| | | | |
|---|---|---|---|
| EP | 2447965 A1 | | 5/2012 |
| JP | 2007-269548 A | | 10/2007 |
| JP | 2007-281410 A | | 10/2007 |
| JP | 2008-060293 A | | 3/2008 |
| JP | 2008-174405 | * | 7/2008 |
| JP | 2008-174405 A | | 7/2008 |
| JP | 2009-224414 | * | 1/2009 |
| JP | 2009-224414 A | | 10/2009 |
| JP | 5445843 B2 | | 3/2014 |
| JP | 2014-216034 A | | 11/2014 |
| JP | 2014-224027 A | | 12/2014 |
| WO | 2008/149785 A1 | | 12/2008 |
| WO | WO 2016/047559 | * | 3/2016 |

* cited by examiner

EPSILON IRON OXIDE AND METHOD FOR PRODUCING THE SAME, MAGNETIC COATING MATERIAL AND MAGNETIC RECORDING MEDIUM

TECHNICAL FIELD

The present invention relates to epsilon iron oxide applied to a high density magnetic recording medium, radio wave absorber, etc., and a method for producing the same, a magnetic coating material and a magnetic recording medium using the epsilon iron oxide.

DESCRIPTION OF RELATED ART

In a magnetic recording medium, in order to achieve high recording density, it is necessary to make a recording unit smaller. It is also necessary that a ferromagnetic state of the magnetic recording medium is maintained under ordinary circumstances such as exposure to storage and use, for example at room temperature. Particularly, stability of magnetization to heat is considered to be proportional to a product of a magnetic anisotropy constant and a particle volume. Here, it is considered that the magnetic anisotropy constant can be increased by increasing a coercive force of the magnetic recording medium. Accordingly, in order to obtain particles with small particle volume and high thermal stability, it is considered effective to use a substance having a high coercive force as a magnetic material.

Based on the abovementioned concept, epsilon iron oxide is found out by inventors of the present invention, as a material exhibiting a huge coercive force of 20 kOe at room temperature even though it is a nano-order particle, which is disclosed in non-patent document 1. It is also found that the coercive force can be controlled by substituting a part of an iron element of the epsilon iron oxide with a metal element different from iron, which is disclosed in patent documents 1 to 4.

[Non-Patent Document 1] Jian Jin, Shinichi Ohkoshi and Kazuhito Hashimoto ADVANCED MATERIALS 2004, 16, No. 1 January 5 pp. 48-51
[Patent Document 1] Japanese Patent Application No. 2006-096907
[Patent Document 2] Japanese Patent Application No. 2006-224954
[Patent Document 3] Japanese Patent Application No. 2006-234958
[Patent Document 4] Japanese Patent Application No. 2009-517830

SUMMARY OF THE INVENTION

Problem to be Solved by the Invention

The epsilon iron oxide disclosed by inventors of the present invention in non-patent document 1 is a substance having a huge coercive force of 20 kOe level. However, in order to use magnetic particles having such a huge coercive force for magnetic recording applications, it is necessary to generate a high magnetic field by using a magnetic head having a higher saturation magnetic flux density, and write information. However, there is no material satisfying such a requirement among materials known as the present head material, and therefore probably it is difficult to apply such magnetic particles for magnetic recording media.

Here, as disclosed in patent documents 1 to 3 by the inventors of the present invention, it is considered that when epsilon iron oxide in which a part of a Fe site is substituted with a trivalent metal of different kind is used, the coercive force can be reduced to a desired value. Then, as disclosed in patent document 4, it becomes also possible to impart thermal stability while securing arbitrary adjustment property of the coercive force of epsilon iron oxide.

However, it is found by the inventors of the present invention that in order to achieve high recording density using epsilon iron oxide, in addition to making the recording unit smaller by decreasing the particle size of the epsilon iron oxide, it is essential to set the coercive force to 14 kOe or less (for example, in an applied magnetic field of 70 kOe) and to make the particle size of the epsilon iron oxide more uniform.

Therefore, an object of the present invention is to provide epsilon iron oxide having an average particle size of 10 to 18 nm, a part of the iron element being substituted with a substitutional element and having a coercive force of 14 kOe or less, wherein a coefficient of variation of the particle size is 40% or less, and provide a method for producing the same, a magnetic coating material and a magnetic recording medium using the epsilon iron oxide.

Means for Solving the Problem

Under the above circumstances, the inventors of the present invention perform research. Then, the inventors of the present invention obtain a knowledge that it is possible to obtain epsilon iron oxide which is an epsilon iron oxide in which a part of the iron element is substituted with a substitutional element and has an average particle size of 10 to 18 nm and a coefficient of variation of the particle size of 40% or less, by executing the steps of: depositing a metal compound of a substitutional element on the iron oxide hydroxide to thereby obtain iron oxide hydroxide on which the metal compound is deposited; coating the iron oxide hydroxide, on which the metal compound is deposited, with silicon oxide to thereby obtain iron oxide hydroxide coated with the silicon oxide; and applying heat treatment to the silicon oxide-coated iron oxide hydroxide in an oxidizing atmosphere. Thus, the present invention is completed.

Namely, in order to solve the abovementioned problem, a first invention is a method for producing epsilon iron oxide, including the steps of:

depositing a metal compound of a substitutional element on iron oxide hydroxide to thereby obtain iron oxide hydroxide on which the metal compound is deposited;

coating the iron oxide hydroxide, on which the metal compound is deposited, with silicon oxide to thereby obtain iron oxide hydroxide coated with the silicon oxide; and applying heat treatment to the silicon oxide-coated iron oxide hydroxide in an oxidizing atmosphere, wherein a part of an iron element is substituted with the substitutional element.

A second invention is the method for producing epsilon iron oxide according to the first invention, wherein the heat-treated powder obtained in the heat-treatment step is further treated with an alkali aqueous solution to thereby produce epsilon iron oxide.

A third invention is the method for producing epsilon iron oxide according to the first or second invention, wherein the step of obtaining the iron oxide hydroxide on which the metal compound is deposited, further includes the steps of:

dissolving a metal salt of the substitutional element in a suspension of the iron oxide hydroxide; and adding an aqueous alkali solution to the suspension of the iron oxide hydroxide in which the metal salt is dissolved to thereby obtain iron oxide hydroxide on which the metal compound is deposited.

A fourth invention is the method for producing epsilon iron oxide according to any one of the first to third inventions, wherein the iron oxide hydroxide on which the metal compound is deposited, is coated with silicon oxide and thereafter dried, to thereby obtain silicon oxide-coated iron oxide hydroxide.

A fifth invention is epsilon iron oxide in which a part of an iron element is substituted with a substitutional element, and which has an average particle size of 10 to 18 nm, and a coefficient of variation of the particle size of 40% or less.

A sixth invention is the epsilon iron oxide according to the fifth invention,
wherein a value of a particle volume (1) is 500 nm$^3$ or more and a value of a particle volume (2) is 10000 nm$^3$ or less,
wherein the particle volume (1) is the value of a volume determined by obtaining a standard deviation of a particle size distribution of epsilon iron oxide of the fifth invention, and spherically approximating the epsilon iron oxide particles, in which a value obtained by subtracting the value of the standard deviation from a value of an average particle size of the epsilon iron oxide is regarded as a lower limit of the particle size of the epsilon iron oxide; and the particle volume (2) is the value of a volume determined by obtaining the standard deviation of the particle size distribution of epsilon iron oxide of the fifth invention, and spherically approximating the epsilon iron oxide particles, in which a value obtained by adding the value of the standard deviation to the average particle size value of the epsilon iron oxide is regarded as an upper limit of the particle size of the epsilon iron oxide.

A seventh invention is the epsilon iron oxide according to the sixth invention, wherein the value obtained by subtracting the value of the particle volume (1) from the value of the particle volume (2) is 5000 nm$^3$ or less.

An eighth invention is a magnetic coating material, wherein the epsilon iron oxide of any one of the fourth to seventh inventions is used.

A ninth invention is a magnetic recording medium, wherein the epsilon iron oxide of any one of the fourth to seventh inventions is used.

Advantage of the Invention

The epsilon iron oxide according to the present invention is suitable as iron oxide for high density recording applications, because the coercive force can be set to 14 kOe or less, the average particle size is 10 to 18 nm, and the coefficient of variation of the particle size is 40% or less.

DETAILED DESCRIPTION OF THE INVENTION

Embodiments of the present invention will be described hereafter, in an order of epsilon iron oxide, substitutional element, transmission electron microscope (TEM) observation, particle volume distribution, a method for producing epsilon iron oxide, a method for producing a magnetic coating material, and a method for producing a magnetic recording medium.

(Epsilon Iron Oxide)

Epsilon iron oxide according to the present invention is an epsilon iron oxide powder in which a part of an iron element is substituted with a substitutional element, which is an epsilon iron oxide powder having an average particle size of 10 to 18 nm and a coefficient of variation of the particle size of 40% or less (Sometimes referred to as "epsilon iron oxide" in the present invention). The epsilon iron oxide according to the present invention having the abovementioned constitution, can control a coercive force (For example, in an applied magnetic field of 70 kOe) to 14 kOe or less, for example by using a predetermined amount of Ga, Al, Co, Ti or the like alone or as a mixture, as the substitutional element. As a result, the epsilon iron oxide according to the present invention becomes optimum as iron oxide for high density recording.

Further, when the epsilon iron oxide according to the present invention is used for different applications such as a magnetic shielding film, it is also possible to set a required coercive force by controlling the kind and a substitution amount of the substitutional element.

(Substitutional Element)

In order to keep a crystal structure of epsilon iron oxide stable, it is preferable to use a divalent metal, a tetravalent metal, or a trivalent metal, as the substitutional element. Further, one or more metal elements selected from Co, Ni, Mn, Zn can be given as the divalent metal, Ti is given as the tetravalent metal, one or more metal elements selected from In, Ga, Al can be given as the trivalent metal, as preferable examples.

By substituting the epsilon iron oxide according to the present invention with a metal element so as to satisfy the above constitution, the coercive force of the magnetic material can be relatively easily controlled depending on an addition amount of the element. As a result, the present magnetic material can be controlled to a usable level even with a publicly known magnetic recording head, as long as the magnetic material is applied to the magnetic recording.

(Transmission Electron Microscope (TEM) Observation)

A photograph of one million times magnification of the epsilon iron oxide sample powder according to the present invention is photographed with a transmission electron microscope (JEOL Ltd., JEM 2000 EX), and from the photograph, a longest diameter and a shortest diameter of each particle of epsilon iron oxide are measured, and an average value is calculated to thereby determine a particle size. The average value of particle sizes obtained for at least 100 or more individual particles of each independent epsilon iron oxide is defined as the average particle size of the sample powder. Then, data on the particle size is statistically processed to thereby calculate a standard deviation and coefficient of variation.

Here, when the calculated standard deviation of the particle size is 40% or less, dispersion of particle sizes becomes small, and dispersion of coercive force distribution becomes small, which is preferable. Further, the average particle size is preferably as fine as each particle having a single magnetic domain structure, and it is preferable that the average particle size observed with a transmission electron microscope is 18 nm or less. However, when the average particle size is too small, magnetic properties per unit weight of the magnetic particle powder is deteriorated. Therefore, the average particle size is preferably 10 nm or more, and more preferably 15 nm or more.
(Particle Volume Distribution)

From a viewpoint of controlling the coercive force of the abovementioned epsilon iron oxide to an appropriate value, the substitutional element is preferably one or more elements selected from In, Ga, Al, Co, Ti.

However, according to the investigation by inventors of the present invention, epsilon iron oxide, which uses these dissimilar metals as substitutional elements, a group of particles with uneven particle size distribution is likely to be formed, compared to epsilon iron oxide without substitution.

Here, the standard deviation of the particle size distribution of epsilon iron oxide according to the present invention is obtained, and a value obtained by subtracting the value of the standard deviation from the value of the average particle size of the epsilon iron oxide, is regarded as a lower limit of the particle size of the epsilon iron oxide, and by spherically approximating the epsilon iron oxide particles, the volume of the particle is determined and used as a particle volume (1). In the same way, a value obtained by adding the value of the standard deviation to the value of the average particle size of the epsilon iron oxide is regarded as an upper limit of the particle size of the epsilon iron oxide, and by spherically approximating the epsilon iron oxide particles, the volume of the particles is determined and used as a particle volume (2).

$$\text{Average particle volume} = (4/3) \times \pi \times ((\text{average particle size (nm)}/2)^3$$

$$\text{Particle volume}(1) = (4/3) \times \pi \times ((\text{average particle size (nm)} - \text{standard deviation (nm) of particle size})/2)^3$$

$$\text{Particle volume}(2) = (4/3) \times \pi \times ((\text{average particle size (nm)} + \text{standard deviation of particle size (nm)})/2)^3$$

At this time, when the particle group satisfies the value of particle volume (1) of 500 nm$^3$ or more and the value of particle volume (2) of 10000 nm$^3$ or less, it is found that the abovementioned uniformity of the particle size distribution is secured, and epsilon iron oxide is suitable as a magnetic particle used for a magnetic recording medium, a magnetic shielding film and the like.

It can be considered that this is because when the value of the particle volume (1) is 500 nm$^3$ or more, the particle is not affected by thermal fluctuation, and there is less possibility of becoming a superparamagnetic substance, and on the other hand, when the value of the particle volume (2) is 10000 nm$^3$ or less, it is possible to avoid such a situation that noise is caused when the particle volume is too large to be a magnetic medium and the coercive force becomes excessively high.

Further, according to the investigation of the inventors of the present invention, it is found to be further preferable that in epsilon iron oxide using dissimilar metals as substitutional elements, the value of particle volume [(2)-(1)] obtained by subtracting the value of particle volume (1) from the value of particle volume (2) is 5000 nm$^3$ or less. The value of 5000 nm$^3$ or less indicates that the distribution of the particle volume is uniform, and it can be considered that a variation in the coercive force distribution is suppressed.

As described above, different element substitution-type epsilon iron oxide according to the present invention has a small particle volume but a uniform particle volume distribution, and therefore is suitable for use as a magnetic powder for a next generation magnetic recording medium. Further, by adjusting the addition amounts of different elements as necessary, adjustment to a desired coercive force value is possible, and therefore it is possible to be used as a magnetic shielding film and a magnetic shielding material in a wide range of applications.
(A Method for Producing Epsilon Iron Oxide)

An example of a method for producing epsilon iron oxide according to the present invention will be described.

Iron oxide hydroxide (III) nanoparticles ($\beta$-FeO(OH)) having an average particle size of 15 nm or less are mixed with pure water, to thereby prepare a dispersion liquid having an iron (Fe)-converted concentration of 0.01 mol/L or more and 1 mol/L or less.

A predetermined amount of a water-soluble metal salt solution of the substitutional element is added to the dispersion liquid, and the mixture is stirred at 0 to 100° C., and preferably 20 to 60° C. To the dispersion liquid, 3 to 30 moles of ammonia per 1 mole of the iron (III) oxide hydroxide is added dropwise using an ammonia aqueous solution, and the mixture is stirred at 0 to 100° C., and preferably 20 to 60° C. for 30 minutes or more. By the stirring, iron oxide hydroxide on which a metal element as a substitutional element is deposited is produced.

Here, 0.5 to 15 moles of tetraethoxysilane (TEOS) per 1 mole of the iron (III) oxide hydroxide is added dropwise to the dispersion liquid to which the ammonia is added, and after the mixture is stirred for 15 hours or more and 30 hours or less, temperature is cooled to room temperature. When the cooling is completed, it is preferable to add a predetermined amount of a precipitating agent (for example, ammonium sulfate, etc.).

The cooled dispersion liquid is centrifuged (for example, at 3500 rpm for 50 minutes), a supernatant is removed, and the precipitate is washed with pure water. Pure water is added to the precipitate and the mixture is stirred to thereby obtain a dispersion liquid, and centrifugation is performed again, to thereby remove the supernatant. After repeating centrifugal separation and pure water washing three times or more, the precipitate is recovered and dried at about 60° C. to thereby obtain a dry powder.

The dried powder is subjected to heat treatment in an oxidizing atmosphere at 900° C. or more and less than 1200° C., preferably 950° C. or more and 1150° C. or less for 0.5 to 10 hours, preferably 2 to 5 hours, to thereby obtain a heat-treated powder. It is preferable to use air atmosphere as the oxidizing atmosphere from the viewpoint of cost and workability.

The heat-treated powder thus obtained is subjected to disintegration treatment, and then added to an aqueous solution of sodium hydroxide (NaOH) aqueous solution having a concentration of about 5 M at a solution temperature of 60° C. or more and 70° C. or less, and a mixture is stirred for 15 hours or more and 30 hours or less so that silicon oxide is removed from the heat-treated powder, to thereby produce epsilon iron oxide powder partially substituted with iron element.

Subsequently, epsilon iron oxide with the produced iron element partially substituted is recovered by performing filtration treatment and centrifugation or the like, to thereby obtain epsilon iron oxide of the present invention having an average particle size of 10 to 18 nm and a coefficient of variation of the particle size of 40% or less.

As described above, although an example of the method for producing epsilon iron oxide has been described, fine particles of the abovementioned iron oxide hydroxide are not necessarily β-FeO(OH) fine particles having an average particle size of 15 nm or less. For example, by using a slurry containing oxidized iron (III) oxide hydroxide particles and having excellent dispersibility of the particles, epsilon iron oxide of the present invention can be obtained.

(A Method for Producing a Magnetic Coating Material)

In order to use the magnetic powder according to the present invention as a magnetic coating material, for example, the following method can be adopted.

Namely, 0.500 g of a sample powder (the abovementioned precipitated powder) is weighed, which is placed in a pot (inner diameter 45 mm, depth 13 mm) and left for 10 minutes with a lid opened. Next, 0.700 mL of a vehicle [vinyl chloride resin MR-110 (22 mass %), cyclohexanone (38.7 mass %), acetylacetone (0.3 mass %), n-butyl stearate (0.3 mass %), methyl ethyl ketone (MEK; 38.7% by mass)] is collected, which is added to the pot.

Thereafter, 30 g of steel ball (2 mm diameter) and 10 pieces of nylon balls (8 mm diameter) are immediately added into the pot, and left for 10 minutes with the lid closed. Thereafter, the pot is set in a centrifugal ball mill, the rotation speed is slowly increased so as to be adjusted to 600 rpm, and dispersion treatment is performed for 60 minutes. After the centrifugal ball mill is stopped, the pot is taken out and 1.800 mL of the conditioning solution previously mixed with MEK and toluene at 1:1 is added. This pot is set in the centrifugal ball mill again and the dispersion treatment is performed for 5 minutes at 600 rpm, to thereby prepare a magnetic coating material.

(A Method for Producing a Magnetic Recording Medium)

As a method for producing a magnetic recording medium using the magnetic powder according to the present invention, for example, the following method can be adopted.

After end of the dispersion treatment in the abovementioned (method for producing a magnetic coating material), the lid of the pot is opened, the nylon ball is removed, the prepared coating material is placed in an applicator (gap: 55 μm) together with the steel ball and applied to a support film. After the application, the film is quickly placed at a center of a coil of an aligner having a magnetic flux density of 0.55 T, a magnetic field is oriented, and thereafter dried, so that a magnetic recording medium can be obtained using the magnetic powder according to the present invention. A method for forming a single magnetic layer has been exemplified here. However, when a known method is adopted, a multilayer magnetic recording medium can be formed.

EXAMPLES

The present invention will be more specifically described hereafter, with reference to examples. The present invention is not limited to the following examples.

Example 1

(Production of Epsilon Iron Oxide)

Figure 1:
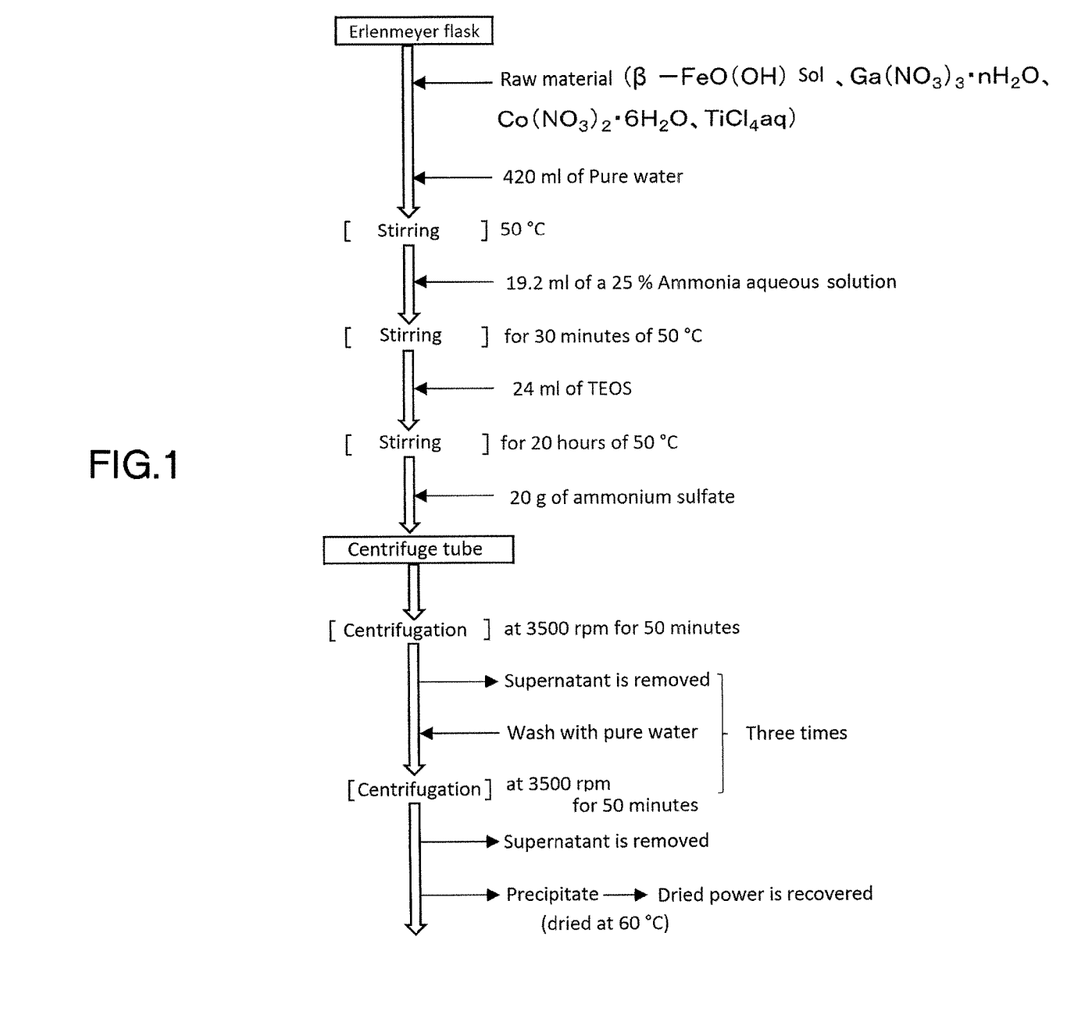
FIG. 1 is a front half (before heat treatment) of a production flow of epsilon iron oxide according to an example.
Figure 2:
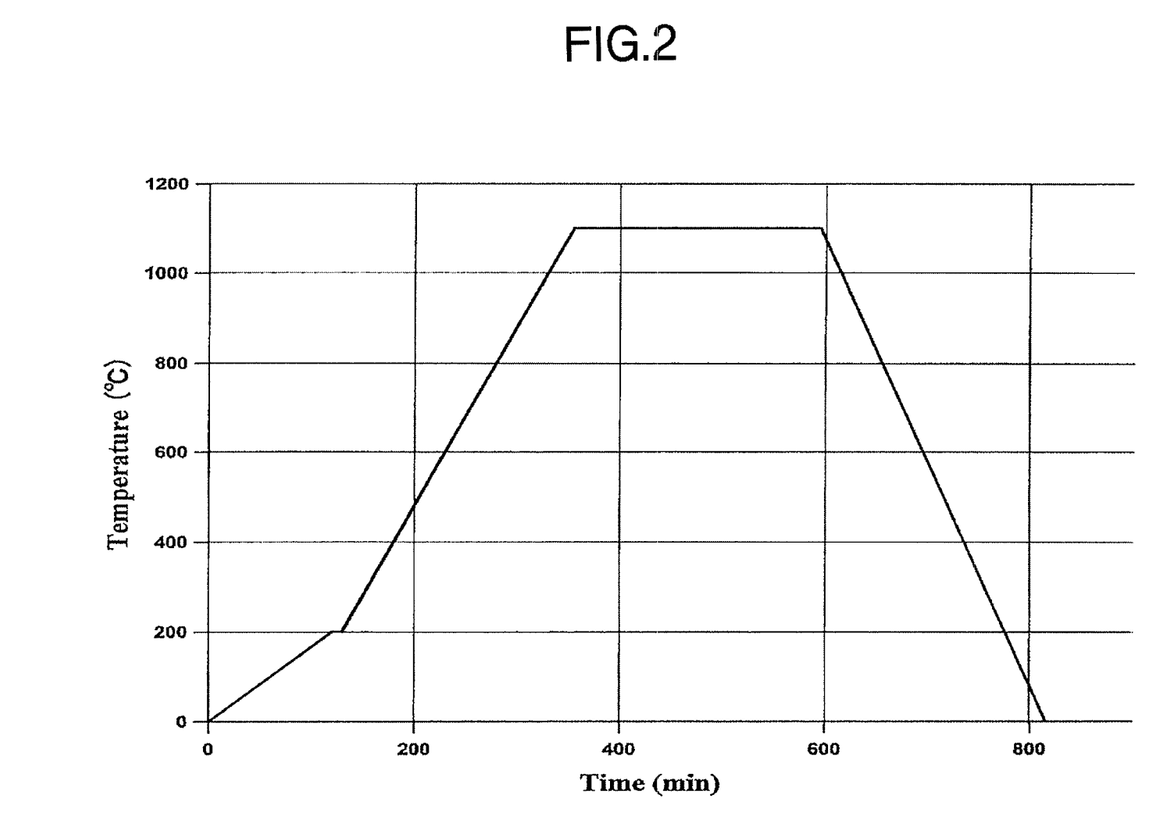
FIG. 2 is a heat treatment condition in the production of epsilon iron oxide according to the example.

The method for producing epsilon iron oxide according to example 1 will be described with reference to FIGS. 1 and 3 which are flow charts of the production method, and FIG. 2 showing heat treatment conditions.

As shown in FIG. 1, 420 mL of pure water and 6.2 g of a sol of oxidized iron hydroxide (III) nanoparticles (β-FeO (OH)) having an average particle size of about 6 nm, 700.72 mg of a powder of $Ga(NO_3)_3 \cdot nH_2O$, 72.86 mg of powder of $Co(NO_3)_2 \cdot 6H_2O$ and 0.05 ml of a $TiCl_4$ solution having a Ti-converted concentration of 16 wt %, were put in a 1 L Erlenmeyer flask, and a mixture was heated to 50° C., and stirred until a uniform dispersion liquid was obtained.

19.2 mL of a 25% ammonia aqueous solution was added dropwise thereto, and a mixture was stirred at 50° C. for 30 minutes. Further, 24 mL of tetraethoxysilane (TEOS) was added dropwise to this dispersion liquid, the mixture was stirred at 50° C. for 20 hours, and allowed to cool to a room temperature. After allowing to cool, a precipitate was allowed to precipitate by adding 20 g of ammonium sulfate.

The precipitate thus precipitated was centrifuged (3500 rpm, 50 minutes), the supernatant was removed, and the precipitate was collected.

The collected precipitate was washed with pure water and centrifuged again.

After performing the centrifugal separation treatment and pure water washing three times, the precipitate was transferred to a petri dish and dried in a dryer at 60° C., to thereby obtain a dry powder.

The pulverized powder was charged in a furnace and subjected to a heat treatment under the heat treatment conditions shown in FIG. 2 in an air atmosphere, to thereby obtain a heat-treated powder.

Figure 3:
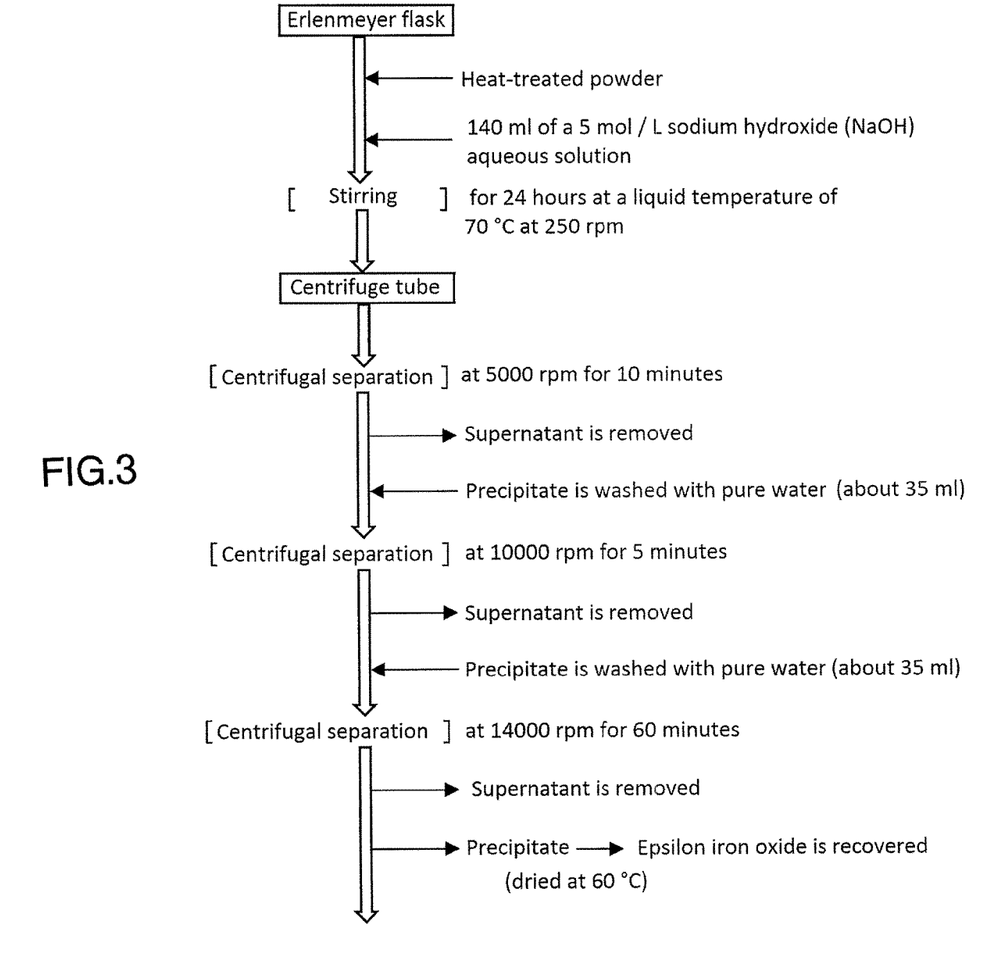
FIG. 3 is a latter half (after heat treatment) of the production flow of epsilon iron oxide according to the example.

As shown in FIG. 3, the obtained heat-treated powder was charged in a 250 mL Erlenmeyer flask, and the mixture was stirred for 24 hours at a liquid temperature of 70° C. in 140 ml of a 5 mol/L sodium hydroxide (NaOH) aqueous solution, to thereby remove silicon oxide from the heat-treated powder.

Subsequently, the heat-treated powder from which silicon oxide was removed, was centrifuged (5000 rpm, 10 minutes), the supernatant was removed, and the precipitate was collected. The collected precipitate was washed with about 35 ml of pure water, centrifuged again (10000 rpm, 5 minutes), and a supernatant was removed, to thereby collect a precipitate. The collected precipitate was washed with about 35 ml of pure water, centrifuged (14000 rpm, 60 minutes), and the supernatant was removed, and this step was repeated twice, to thereby obtain epsilon iron oxide according to example 1.

<Analysis and Measurement Results of Epsilon Iron Oxide>

Epsilon iron oxide according to example 1 thus obtained was subjected to elemental analysis using ICP (Agilent 7700x) manufactured by Agilent Technologies Co., Ltd. for high frequency induction plasma emission spectrometry, and the results are shown in table 1.

Further, the epsilon iron oxide according to example 1 was observed with a transmission electron microscope (TEM), and the average particle size was found to be 16.4 nm.

Values of the average particle size, standard deviation, coefficient of variation, average particle volume, particle volume (1), particle volume (2), particle volume [(2)-(1)] of the obtained epsilon iron oxide according to example 1 are shown in table 1.

Further, magnetic properties (coercive force, saturation magnetization, remnant magnetization) of epsilon iron oxide according to example 1 were measured. Specifically, measurement was performed at a maximum applied magnetic field of 70 kOe at a temperature of 300 K using SQUID (superconducting quantum interferometer) of MPMS 7 manufactured by Quantum Design Corporation.

The obtained coercive force, saturation magnetization, and residual magnetization values are shown in table 1.

Example 2

Epsilon iron oxide according to example 2 was obtained by the same operation as example 1 except that 420 mL of pure water and 7.2 g of sol of oxidized iron (III) oxide nanoparticles (β-FeO(OH)) having an average particle size of about 6 nm, 200.74 mg of powder of $Ga(NO_3)_3 \cdot nH_2O$, 72.93 mg of powder of $Co(NO_3)_2 \cdot 6H_2O$, and 0.05 ml of a $TiCl_4$ solution having a Ti-converted concentration of 16 wt %, were put in the 1 L erlenmeyer flask.

As a result of elemental analysis using ICP in the obtained epsilon iron oxide according to example 2, values of the average particle size, standard deviation, coefficient of variation, average particle volume, particle volume (1), particle volume (2), particle volume [(2)-(1)], coercive force, saturation magnetization, and residual magnetization are shown in table 1.

Example 3

Epsilon iron oxide according to example 3 was obtained by the same operation as example 1 except that 420 g of pure water, 7.6 g of sol of iron oxide (III) oxide nanoparticles (β-FeO(OH)) having an average particle size of about 6 nm, and 72.87 mg of powder of $Co(NO_3)_2 \cdot 6H_2O$, were put in the 1 L erlenmeyer flask.

As a result of elemental analysis using ICP in the obtained epsilon iron oxide according to example 3, values of the average particle size, standard deviation, coefficient of variation, average particle volume, particle volume (1), particle volume (2), particle volume [(2)-(1)], and coercive force, saturation magnetization, and residual magnetization are shown in table 1.

Example 4

Epsilon iron oxide according to example 4 was obtained by the same operation as example 1 except that 420 mL of pure water and 7.6 g of sol of iron oxide hydroxide (III) nanoparticles (β-FeO(OH)) having an average particle size of about 6 nm, and 201.21 mg of powder of $Ga(NO_3)_3 \cdot nH_2O$, were put in the 1 L erlenmeyer flask.

As a result of performing elemental analysis of the obtained epsilon iron oxide according to example 4 using ICP, values of the average particle size, standard deviation, coefficient of variation, average particle volume, average particle volume, particle volume (1), particle volume (2), particle volume [(2)-(1)], coercive force, saturation magnetization, and residual magnetization are shown in table 1.

Example 5

Epsilon iron oxide according to example 5 was obtained by the same operation as example 1 except that 420 mL of pure water, 6.6 g of sol of iron oxide hydroxide (III) nanoparticles (β-FeO(OH)) having an average particle size of about 6 nm, and 701.05 mg of powder of $Ga(NO_3)_3 \cdot nH_2O$ were put in 1 L erlenmeyer flask.

As a result of performing elemental analysis of the obtained epsilon iron oxide according to example 5 using ICP, values of the average particle size, standard deviation, coefficient of variation, average particle volume, average particle volume, particle volume (1), particle volume (2), particle volume [(2)-(1)], coercive force, saturation magnetization, and residual magnetization are shown in table 1.

Example 6

Epsilon iron oxide according to example 6 was obtained by the same operation as example 1 except that 420 mL of pure water, 6.6 g of sol of iron oxide hydroxide (III) nanoparticles (β-FeO(OH)) having an average particle size of about 6 nm, and 656.53 mg of $Al(NO_3)_3 \cdot 9H_2O$ compound were put in 1 L erlenmeyer flask.

As a result of performing elemental analysis of the obtained epsilon iron oxide according to example 6 using ICP, values of the average particle size, standard deviation, coefficient of variation, average particle volume, average particle volume, particle volume (1), article volume (2), particle volume [(2)-(1)], coercive force, saturation magnetization, and residual magnetization are shown in table 1.

Comparative Example 1

[Procedure 1]

Two types of solutions of a raw material solution and a neutralizer solution are prepared.

(Preparation of a Raw Material Solution)

24.3 mL of pure water is put in a Teflon (registered trademark) flask. Iron (III) nitrate nonahydrate, gallium (III) nitrate n hydrate, cobalt (II) nitrate hexahydrate and titanium sulfate (IV) n hydrate are respectively charged in this flask so that the composition of the produced epsilon oxide according to comparative example 1 is $Fe_{1.60}Ga_{0.27}Co_{0.05}Ti_{0.06}O_3$, and a solution is thoroughly stirred at room temperature, to thereby obtain a raw material solution.

(Preparation of Neutralizer Solution)

2.0 mL of 25% aqueous ammonia is charged into 22.3 mL of pure water and stirred, to thereby obtain a neutralizer solution.

[Procedure 2]

The neutralizer solution is dropped into the raw material solution while stirring the raw material solution well at 1,500 rpm, and both solutions are stirred and mixed, to thereby allow a neutralization reaction to proceed. After all the neutralizer solution is added dropwise, the mixture is kept stirred for 30 minutes.

[Procedure 3]

0.495 mL of tetraethoxysilane is added dropwise to the mixed solution, while stirring the mixed solution obtained in procedure 2, and stirring is continued for about 1 day.

[Procedure 4]

The mixture obtained in procedure 3 is filtered, and the precipitate is collected and washed with pure water.

[Procedure 5]

After the precipitate obtained in procedure 4 is dried, it is subjected to a heat treatment at 1100° C. for 4 hours in a furnace in the air atmosphere, to thereby obtain a heat-treated powder.

[Procedure 6]

The heat-treated powder obtained in procedure 5 is added to a NaOH aqueous solution having a concentration of 2 mol/L, and the mixture is stirred for 24 hours, to thereby perform removal treatment of silica present on the surface of the particles of the heat-treated powder. Following the removal treatment of silica, filtration, washing with water and drying are performed, to thereby obtain epsilon iron oxide according to comparative example 1.

As a result of performing elemental analysis of the obtained epsilon iron oxide according to comparative example 1 using ICP, values of the average particle size, standard deviation, coefficient of variation, average particle volume, average particle volume, particle volume (1), particle volume (2), and particle volume [(2)-(1)] are shown in table 1.

Since the value of the coefficient of variation exceeds 40%, measurement of magnetic properties is omitted.

Comparative Example 2

In procedure 1, 24.3 mL of pure water is put in a Teflon (registered trademark) flask. Then, epsilon iron oxide according to comparative example 2 was obtained by the same operation as comparative example 1 except that iron (III) nitrate nonahydrate, gallium (III) nitrate hydrate, cobalt (II) nitrate hexahydrate, and titanium sulfate (IV) n hydrate were respectively charged in this flask so that a composition of the produced epsilon iron oxide according to comparative example 2 was $Fe_{1.79}Ga_{0.10}Co_{0.05}Ti_{0.06}O_3$.

As a result of performing elemental analysis of the obtained epsilon iron oxide according to comparative example 2 using ICP, values of the average particle size, standard deviation, coefficient of variation, average particle volume, average particle volume, particle volume (1), particle volume (2), and particle volume [(2)-(1)] are shown in table 1.

Since the value of the coefficient of variation exceeds 40%, measurement of magnetic properties is omitted.

Comparative Example 3

[Procedure 1]
Two kinds of solutions of solution A and neutralizer solution B, which will be described below, are prepared.
(Preparation of Solution A)
24.3 mL of pure water is put in a Teflon (registered trademark) flask, and iron (III) nitrate nonahydrate, cobalt (II) nitrate hexahydrate, and titanium sulfate (IV) n hydrate are respectively charged in this flask so that a composition of the produced epsilon iron oxide according to comparative example 3 is $Fe_{1.79}Co_{0.10}Ti_{0.11}O_3$. When addition is completed, the mixture is stirred, to thereby obtain solution A.
(Preparation of Neutralizer Solution B)
2.0 mL of 25% ammonia water is added to 22.3 mL of pure water and stirred to thereby obtain solution B.
[Procedure 2]
The neutralizer solution B is added dropwise to the solution A. After end of the dropwise addition, the obtained mixture is kept stirred for 30 minutes.

[Procedure 3]
0.49 mL of tetraethoxysilane is added to the mixed solution while stirring the mixed solution obtained in procedure 2. Then, after the addition, stirring is continued for about 1 day.
[Procedure 4]
The mixed solution obtained in procedure 3 is filtered, and the precipitate is collected and washed with pure water.
[Procedure 5]
After the precipitate obtained in procedure 4 is dried, and heat-treated at 1100° C. for 4 hours in a furnace in the air atmosphere, to thereby obtain a heat-treated powder.
[Procedure 6]
The heat-treated powder obtained in procedure 5 is added to a NaOH aqueous solution having a concentration of 2 mol/L, and the mixture is stirred for 24 hours to thereby perform removal treatment of silica present on the surface of the particles of the heat-treated powder. Following the removal treatment of silica, filtration, washing with water and drying are performed to thereby obtain epsilon oxide according to comparative example 3.

As a result of performing elemental analysis of the obtained epsilon iron oxide according to comparative example 3 using ICP, values of the average particle size, standard deviation, coefficient of variation, average particle volume, average particle volume, particle volume (1), particle volume (2), and particle volume [(2)-(1)] are shown in table 1.

Since the value of the coefficient of variation exceeds 40%, measurement of magnetic properties is omitted.

Comparative Example 4

Epsilon iron oxide according to comparative example 4 was obtained by the same operation as example 1 except that only 420 mL of pure water and 8.0 g of sol of an oxide hydroxide (III) oxide nanoparticle (β-FeO(OH)) having an average particle size of about 6 nm were put in the 1 L erlenmeyer flask.

As a result of performing elemental analysis of the obtained epsilon iron oxide according to comparative example 4 using ICP, values of the average particle size, standard deviation, coefficient of variation, average particle volume, average particle volume, particle volume (1), particle volume (2), and particle volume [(2)-(1)], coercive force, saturation magnetization, and residual magnetization are shown in table 1.

TABLE 1

| | Composition | | | | | Particle size | | | Particle volume distribution | | | | Coercive force | | *1 | *2 |
|---|---|---|---|---|---|---|---|---|---|---|---|---|---|---|---|---|
| | (Atomic ratio) | | | | | Average | | *4 | Average | *5 (1) | *5 (2) | *5 [(2) − (1)] | | | | |
| | Fe | Ga | Al | Co | Ti | (nm) | *3 | (%) | (nm$^3$) | (nm$^3$) | (nm$^3$) | (nm$^3$) | (kOe) | (kA/m) | (emu/g) | (emu/g) |
| *1 | 1.60 | 0.31 | — | 0.05 | 0.04 | 16.4 | 5.9 | 36 | 2310 | 606 | 5810 | 5200 | 3.1 | 247 | 23.6 | 8.6 |
| *2 | 1.82 | 0.09 | — | 0.05 | 0.04 | 16.9 | 6.1 | 36 | 2530 | 660 | 6370 | 5710 | 7.5 | 597 | 21.0 | 9.0 |
| *3 | 1.92 | — | — | 0.04 | 0.04 | 16.4 | 6.2 | 38 | 2310 | 556 | 6040 | 5480 | 9.9 | 788 | 19.5 | 8.4 |
| *4 | 1.89 | 0.11 | — | — | — | 16.1 | 4.7 | 29 | 2190 | 776 | 4710 | 3930 | 13.1 | 1042 | 20.2 | 9.7 |
| *5 | 1.69 | 0.30 | — | — | — | 17.2 | 4.8 | 28 | 2660 | 998 | 5580 | 4580 | 7.4 | 589 | 23.9 | 10.3 |
| *6 | 1.76 | — | 0.24 | — | — | 16.8 | 4.9 | 29 | 2480 | 882 | 5350 | 4470 | 12.8 | 1019 | 18.4 | 8.8 |
| **1 | 1.60 | 0.27 | — | 0.05 | 0.06 | 19.3 | 8.2 | 42 | 3760 | 716 | 10900 | 10200 | — | — | — | — |
| **2 | 1.79 | 0.10 | — | 0.05 | 0.06 | 19.7 | 9.0 | 46 | 4000 | 641 | 12400 | 11800 | — | — | — | — |
| **3 | 1.79 | — | — | 0.10 | 0.11 | 18.8 | 9.6 | 51 | 3480 | 408 | 12000 | 11600 | — | — | — | — |

TABLE 1-continued

| Composition (Atomic ratio) | | | | | Particle size | | | Particle volume distribution | | | | Coercive force | | *1 | *2 |
| --- | --- | --- | --- | --- | --- | --- | --- | --- | --- | --- | --- | --- | --- | --- | --- |
| | | | | | Average | | *4 | Average | *5 (1) | *5 (2) | *5 [(2) − (1)] | | | | |
| Fe | Ga | Al | Co | Ti | (nm) | *3 | (%) | (nm$^3$) | (nm$^3$) | (nm$^3$) | (nm$^3$) | (kOe) | (kA/m) | (emu/g) | (emu/g) |
| **4 2.00 (ICP analysis value) | — | — | — | — | 16.0 | 4.3 | 27 | 2140 | 839 | 4380 | 3540 | 17.1 | 1361 | 17.7 | 8.8 (Applied magnetic field 70 kOe) |

*Example
**Comparative example
*1 Saturation magnetization
*2 Residual magnetization
*3 Standard deviation
*4 Coefficient of variation
*5 Particle volume

The invention claimed is:

1. A method for producing epsilon iron oxide, comprising:
depositing a metal compound of a substitutional element on iron oxide hydroxide to thereby obtain iron oxide hydroxide on which the metal compound is deposited;
coating the iron oxide hydroxide on which the metal compound is deposited, with silicon oxide to thereby obtain iron oxide hydroxide coated with the silicon oxide; and
applying heat treatment to the silicon oxide-coated iron oxide hydroxide in an oxidizing atmosphere,
wherein a part of an iron element is substituted with the substitutional element.

2. The method for producing epsilon iron oxide according to claim 1, wherein the heat-treated powder obtained in the heat-treatment is further treated with an alkali aqueous solution to thereby produce epsilon iron oxide.

3. The method for producing epsilon iron oxide according to claim 1, wherein obtaining the iron oxide hydroxide on which the metal compound is deposited further comprises:
dissolving a metal salt of the substitutional element in a suspension of the iron oxide hydroxide; and
adding an aqueous alkali solution to the suspension of the iron oxide hydroxide in which the metal salt is dissolved to thereby obtain iron oxide hydroxide on which the metal compound is deposited.

4. The method for producing epsilon iron oxide according to claim 1, wherein the iron oxide hydroxide on which the metal compound is deposited is coated with silicon oxide and thereafter dried, to thereby obtain silicon oxide-coated iron oxide hydroxide.

5. Epsilon iron oxide in which a part of an iron element is substituted with a substitutional element, and which has an average particle size of 10 to 18 nm, and a coefficient of variation of the particle size of 40% or less,
wherein:
a value of a particle volume (1) is 500 nm$^3$ or more and a value of a particle volume (2) is 10000 nm$^3$ or less,
the particle volume (1) is the value of a volume determined by obtaining a standard deviation of a particle size distribution of the epsilon iron oxide, and spherically approximating the epsilon iron oxide particles, in which a value obtained by subtracting the value of the standard deviation from a value of an average particle size of the epsilon iron oxide is regarded as a lower limit of the particle size of the epsilon iron oxide; and
the particle volume (2) is the value of a volume determined by obtaining the standard deviation of the particle size distribution of the epsilon iron oxide, and spherically approximating the epsilon iron oxide particles, in which a value obtained by adding the value of the standard deviation to the average particle size value of the epsilon iron oxide is regarded as an upper limit of the particle size of the epsilon iron oxide.

6. The epsilon iron oxide according to claim 5, wherein the value obtained by subtracting the value of the particle volume (1) from the value of the particle volume (2) is 5000 nm$^3$ or less.

7. A magnetic coating material, wherein the epsilon iron oxide of claim 5 is used.

8. A magnetic recording medium, wherein the epsilon iron oxide of claim 5 is used.

9. The method for producing epsilon iron oxide according to claim 2, wherein obtaining the iron oxide hydroxide on which the metal compound is deposited further comprises:
dissolving a metal salt of the substitutional element in a suspension of the iron oxide hydroxide; and
adding an aqueous alkali solution to the suspension of the iron oxide hydroxide in which the metal salt is dissolved to thereby obtain iron oxide hydroxide on which the metal compound is deposited.

10. The method for producing epsilon iron oxide according to claim 2, wherein the iron oxide hydroxide on which the metal compound is deposited is coated with silicon oxide and thereafter dried, to thereby obtain silicon oxide-coated iron oxide hydroxide.

11. The method for producing epsilon iron oxide according to claim 3, wherein the iron oxide hydroxide on which the metal compound is deposited is coated with silicon oxide and thereafter dried, to thereby obtain silicon oxide-coated iron oxide hydroxide.

12. The method for producing epsilon iron oxide according to claim 9, wherein the iron oxide hydroxide on which the metal compound is deposited is coated with silicon oxide and thereafter dried, to thereby obtain silicon oxide-coated iron oxide hydroxide.

13. A magnetic coating material, wherein the epsilon iron oxide of claim 6 is used.

14. A magnetic recording medium, wherein the epsilon iron oxide of claim 6 is used.

* * * * *